(12) United States Patent
Fiedrich

(10) Patent No.: US 8,898,997 B2
(45) Date of Patent: *Dec. 2, 2014

(54) IN-WALL HYDRONIC THERMAL CONTROL SYSTEM AND INSTALLATION METHOD

(71) Applicant: Joachim Fiedrich, Carlisle, MA (US)

(72) Inventor: Joachim Fiedrich, Carlisle, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/625,202

(22) Filed: Sep. 24, 2012

(65) Prior Publication Data

US 2013/0255912 A1 Oct. 3, 2013

Related U.S. Application Data

(63) Continuation-in-part of application No. PCT/US2011/029565, filed on Mar. 23, 2011, which is (Continued)

(51) Int. Cl.
*A01G 9/12* (2006.01)
*F24D 3/14* (2006.01)

(Continued)

(52) U.S. Cl.
CPC .............. *F24D 3/145* (2013.01); *F24F 5/0089* (2013.01); *E04B 2/00* (2013.01);

(Continued)

(58) Field of Classification Search
CPC .............. E04C 2/34; E04C 2/292; E04C 2/52; F24D 5/10; F24D 19/02; F24D 3/16; F24D 3/145; F24D 5/12; F24D 13/024; E04B 1/16; E04B 2/00; E04B 5/48; F24F 5/0089; F24H 9/06; F24H 1/00; F24C 15/08

USPC ........ 52/481.1, 220.1, 745.09, 742.1; 237/73, 237/74, 50, 59, 81, 69–71, 8 C, 8 A; 165/47, 165/48.1, 49, 56, 45, 170, 168

See application file for complete search history.

(56) References Cited

U.S. PATENT DOCUMENTS 5,119,988 A 6/1992 Fiedrich
5,131,458 A 7/1992 Bourne et al.

(Continued)

FOREIGN PATENT DOCUMENTS

DE 100 19 315 A1 5/2001
DE 10 2005 029 051 A1 12/2006

(Continued)

OTHER PUBLICATIONS

International Search Report dated Aug. 17, 2012, from counterpart International Application No. PCT/US2011/029565, filed on Mar. 23, 2011.

(Continued)

*Primary Examiner* — Brian Glessner
*Assistant Examiner* — Beth Stephan
(74) *Attorney, Agent, or Firm* — Houston & Associates, LLP

(57) ABSTRACT

A system for installing tubing of hydronic thermal control systems in the walls, including ceilings, of buildings. It allows for the stable incorporation of the tubing in the walls while ensuring good thermal conductivity between the tubing and the building's room. The system features a wall including a hydronic thermal management system. The wall comprises a vertically-extending wall support structure, tubing panels secured to the wall support structure, the panels being constructed from wood material, tubing in the tubing panels for carrying a heat transfer fluid, and drywall panels secured over the tubing panels. A filling material is applied between the tubing and the drywall panels. Also a high thermally conductive layer, such as aluminum foil, is used between the filling material and the drywall panels or between the filling material and the tubing panels.

23 Claims, 1 Drawing Sheet

Related U.S. Application Data a continuation-in-part of application No. 12/898,882, filed on Oct. 6, 2010, now Pat. No. 8,650,832, application No. 13/625,202, which is a continuation-in-part of application No. 12/898,882, filed on Oct. 6, 2010, now Pat. No. 8,650,832.

(60) Provisional application No. 61/316,944, filed on Mar. 24, 2010.

(51) Int. Cl.
- *F24F 5/00* (2006.01)
- *E04B 2/00* (2006.01)
- *E04C 2/52* (2006.01)
- *F24D 19/10* (2006.01)
- *F28D 21/00* (2006.01)
- *F28F 13/00* (2006.01)

(52) U.S. Cl.
CPC . *E04C 2/525* (2013.01); *F24D 3/14* (2013.01); *F24D 19/1006* (2013.01); *F28D 2021/0035* (2013.01); *F28D 2021/0078* (2013.01); *F28F 2013/006* (2013.01)
USPC ........... 52/745.09; 237/71; 165/49; 52/220.1; 52/742.1

(56) References Cited

U.S. PATENT DOCUMENTS

| | | | |
|---|---|---|---|
| 5,292,065 A | 3/1994 | Fiedrich | |
| 5,352,731 A | 10/1994 | Nakano et al. | |
| 5,454,428 A | 10/1995 | Pickard et al. | |
| 5,579,996 A | 12/1996 | Fiedrich | |
| 5,788,152 A | 8/1998 | Alsberg | |
| 5,931,381 A | 8/1999 | Fiedrich | |
| 5,939,212 A * | 8/1999 | Ragland et al. | 428/594 |
| 5,957,378 A | 9/1999 | Fiedrich | |
| 6,092,587 A | 7/2000 | Ingram | |
| 6,152,377 A | 11/2000 | Fiedrich | |
| 6,205,729 B1 | 3/2001 | Porter | |
| 6,220,523 B1 | 4/2001 | Fiedrich | |
| 6,330,980 B1 | 12/2001 | Fiedrich | |
| 6,533,185 B1 | 3/2003 | Muir | |
| 7,208,192 B2 | 4/2007 | Bunyan et al. | |
| 7,836,652 B2 | 11/2010 | Futterman | |
| 8,028,742 B2 | 10/2011 | Fiedrich | |
| 2004/0026525 A1 | 2/2004 | Fiedrich | |
| 2004/0103610 A1 | 6/2004 | Axsom | |
| 2004/0177581 A1 | 9/2004 | Starke | |
| 2009/0320397 A1* | 12/2009 | Hansbro et al. | 52/302.1 |

FOREIGN PATENT DOCUMENTS

| | | |
|---|---|---|
| EP | 0 133 631 A1 | 3/1985 |
| GB | 2460420 A | 12/2009 |

OTHER PUBLICATIONS

International Preliminary Report on Patentability dated Oct. 18, 2012 from counterpart Application No. PCT/US2011/029565, filed on Mar. 23, 2011.

* cited by examiner

US 8,898,997 B2

IN-WALL HYDRONIC THERMAL CONTROL SYSTEM AND INSTALLATION METHOD

RELATED APPLICATIONS

This application is a Continuation-in-Part of International Application No. PCT/US2011/029565, filed on Mar. 23, 2011, which claims priority to U.S. application Ser. No. 12/898,882, filed on Oct. 6, 2010, which claims the benefit under 35 U.S.C. §119(e) of U.S. Provisional Application No. 61/316,944, filed on Mar. 24, 2010. This application is also a Continuation-in-Part of U.S. application Ser. No. 12/898,882, filed on Oct. 6, 2010, which claims the benefit under 35 U.S.C. §119(e) of U.S. Provisional Application No. 61/316,944, filed on Mar. 24, 2010.

All of the foregoing applications are fully incorporated herein by reference in their entirety.

BACKGROUND OF THE INVENTION

Hydronic radiant floor, wall, and/or ceiling thermal control systems are typically used for heating a space, such as a room in a dwelling or commercial building, usually for human and creature comfort. Typical hydronic heating systems require a supply of hot water, or other fluid, from a boiler, for example, and valves for controlling the quantity of the water from the supply that is fed to heating loops, which include tubing and/or heating elements. These heating loops are in thermal contact with the space or rooms to be heated or cooled. It is often necessary to control the temperature of the water in the heating loops. For example, if the supply water temperature is set to about 180° F. (80° C.) for laundry, it must be modulated down to about 100° F. or 40° C., (or lower) for radiant systems. On the other hand, chillers can be used to supply cold water during the summer months for cooling.

A suitable system for reducing and controlling the supply water temperature is described in U.S. Pat. No. 5,119,988, issued Jun. 9, 1992, entitled "Hydronic Heating Water Temperature Control System", to Joachim Fiedrich, the inventor herein. In that patent, a three-way, modulated diverting or by-pass valve is provided, in the return line to the boiler, for diverting some of the cooler return water to the hot supply water to reduce the temperature of the supply water feeding the heating loop supply header. This is sometimes called temperature dilution and the diverting valve is modulated by a feedback signal derived from the diluted water temperature.

A number of approaches are available for distributing the tubing in the space to be heated to form the heating loops. In one such approach, the tubing is set in the concrete flooring. In other cases, the heat loop tubing is installed between the floor or ceiling joists using metal radiation plates.

A preferable approach for forming the heating loops in floors relies on modular panel heating elements. Some examples are described in U.S. Pat. No. 5,292,065, issued Mar. 8, 1994, entitled "Radiant Floor and Wall Hydronic Heating Systems", to Joachim Fiedrich, the inventor herein. The panel elements include integral metal radiation plates or sheets that are attached to two spaced apart boards, which cooperate to hold the tubing in intimate thermal contact with the radiation plate, so that the plate is heated by conduction of heat from the tubing. The plate then provides a surface that radiates heat into the room. Thermal conduction from the tubing to the plate and mechanical attachment of the tubing to the panel can also be ensured by using a resilient, thermally-conductive filler material as described in U.S. Pat. No. 5,579,996, issued Dec. 3, 1996, entitled "Radiant Floor and Wall Hydronic Heating Systems", also to Joachim Fiedrich, the inventor herein.

These hydronic thermal control systems can also be used for cooling. The cooling is accomplished by feeding cool water or fluid to the tubing to reduce the temperature of the radiation plate in the modular panel, to below room temperature. As a result, heat is radiated from the room to cool water in the tubing. This heats the water slightly, and the water is then fed to a heat exchanger or chiller, for example, where it gives up the heat and is fed back to the panels.

More recently, the instant inventor described a system of installing the tubing in sheets of gypsum or cement wallboard as described in U.S. Pat. Appl. Publ. No. 2004/0026525 A1, entitled "In radiant wall and ceiling hydronic room heating or cooling systems, using tubing that is fed hot or cold water, the tubing is embedded in gypsum or cement wallboard in intimate thermal contact therewith so that the wallboard heats or cools the room", which is incorporated herein in its entirety by this reference.

Often, these modular panel systems use a number of different types of panels to create the continuous tracks required to hold the tubing of the radiant loops. Most commonly, straight, lateral run track panels are connected end-to-end to provide tubing tracks that extend laterally across the room floor to be heated or cooled. At the end of the tracks on each of these lateral run panels, "U" turn or return track panels are usually used. These return track panels comprise arcuate tracks that allow the tubing to be routed between successive tracks in the lateral run track panels by laying the tubing through the 180 degree arc of the return track. Using the combination of the straight tracks of the lateral run track panels and the return tracks of the return track panels, large serpentine radiant tubing loops can be created in the floors of rooms or other spaces.

In order to complete the radiant heating/cooling loops, connections must be further made between the tubing loops and the manifold, circulating pump, and/or injection valve control assemblies that are located, for example, in a closet or other area near or in the room or space to be heated or cooled. This routing between the typically serpentine layout of the tubing in the floor, for example, and the manifold, pump, and injection valves of the control assemblies can be performed either in-plane and/or out-of-plane.

In in-plane routing, the connections are routed, at least in part, in the plane of the floor. Often, the long runs to the control assembly can be made in tracks constructed from the lateral run track panels. This has advantages since the tubing routed in this connection can also contribute to the heating and/or cooling of the space.

Routing between the serpentine tubing layout on the floor and the control assembly can also be performed out-of-plane. In this case, a hole is usually drilled through the floor, for example, and then the tubing is routed between or through the floor joints to connect the serpentine layout with the control assembly.

SUMMARY OF THE INVENTION

In the past, there has been limited success at incorporating hydronic thermal control systems in the vertically-extending walls of buildings. The previous approach of incorporating the tubing in the gypsum wallboard met with limited success. Incorporation of the tubing in the wallboard and/or the formation of tracks in the wallboard made the wallboard mechanically unstable and subject to breakage. Moreover, the relatively weak gypsum material did not hold the relatively rigid and inflexible PEX (cross-linked polyethylene) tubing that is commonly used for hydronic thermal management systems.

Nevertheless, there are advantages to deploying the tubing in the walls. The relatively stable gypsum drywall or cement board can better withstand thermal cycling than hardwood floors, for example. Moreover, higher temperatures can be used in the walls since the occupants rarely touch the walls whereas they are usually in contact with the floors. Moreover, often rugs are used on the floors, which undermine the ability of the tubing installed in the floors to control the temperature of the associated room. In contrast, most of the wall surfaces are exposed in most buildings.

The present invention concerns an improved system for installing tubing of hydronic thermal control systems in the walls, including ceilings, of buildings. It allows for the stable incorporation of the tubing in the walls while ensuring good thermal conductivity between the tubing and the building's room.

In general, according to one aspect, the invention features a wall including a hydronic thermal management system. The wall comprises a vertically-extending wall support structure, tubing panels secured to the wall support structure, the panels being constructed from wood material, tubing in the tubing panels for carrying a heat transfer fluid, and wall panels secured over the tubing panels.

In the preferred embodiments, a filling material is used between the tubing and the drywall panels. Currently, mastic or other putty-like hardening substance is used. The wall support structure comprises vertically extending studs, preferably with insulation between the studs. The tubing panels preferably comprise tracks, the tubing being press-fit into the tracks. A thermal control system, including a boiler and/or chiller and pumps, is used for flowing the fluid through the tubing. The wall preferably comprises an aluminum foil layer between the filling material and the wall panels or alternatively the aluminum foil layer is between the filling material and the tubing panels. The aluminum foil is attached with an adhesive between the filling material and the wall panels or filling material and tubing panels. Also, the wall includes a moisture barrier backing for the tubing panels to prevent moisture from permeating through the wall and improve panel strength/rigidity.

In general according to another aspect, the invention features a method for fabricating a wall including a hydronic thermal management system. The method comprises providing a vertically-extending wall support structure, securing tubing panels to the wall support structure, the panels being constructed from wood material, providing tubing in the tubing panels for carrying a heat transfer fluid, and securing drywall panels over the tubing panels.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

Figure 1:
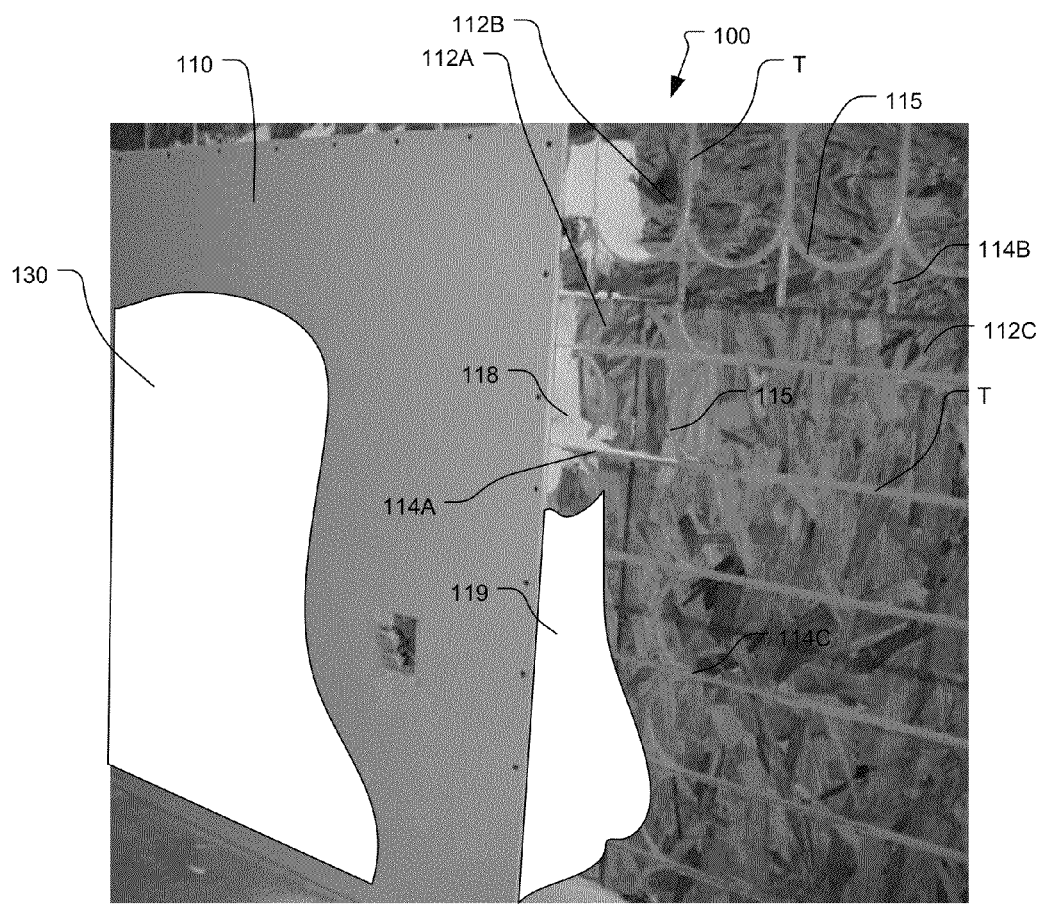
FIG. 1 is a partial perspective view of a partially completed wall including a hydronic thermal management system.

FIG. 1 shows a wall including a hydronic thermal management system, which has been constructed according to the principles of the present invention.

The wall 100 is constructed from tubing panels 112, i.e., 112A, 112B, 112C. In the preferred embodiment, these tubing panels 112 are constructed from a wood material. In one example, the panels are plywood panels. In one implementation, the tubing panels 112 are fabricated from oriented strand board (OSD) plywood, which is produced by binding wood chips with a mix of glue and resin. In another example, the panels 112 are constructed from CDX plywood. This type of plywood is produced by gluing together sheets of veneer, each layer being glued in the opposite grain to the one below it. In still other examples, other engineered wood or plant material products are used for the tubing panels 112. These include fiberboard, such as particle board, and hard board.

In the current implementation, the thickness of the tubing panels is ½ or ⅜ inches. The panels are usually 4 feet (ft) wide by 8 ft long or 3 ft wide by 5 ft long.

In the preferred embodiment, tracks 114A, 114B, 114C, are fabricated in the tubing panels 112. In the current embodiment, the tracks 114 are fabricated in the tubing panels 112 using a computer controlled router. The router bores out the tracks with a "U" cross-section. Preferably, the tracks 114 have constricted mouths so that the tubing T is press fit into the tracks using the compliance of material of the tubing panels 112 and tubing and then is retained in the track by an interference fit.

Generally, the tracks 114 extend along the longitudinal direction of each of the panels 112. In the illustrated example, arcuate or return tracks 115 connect each of the longitudinally extending lateral run tracks 114 to allow routing between the longitudinal tracks 114.

Tubing T is pressfit into the tracks 114 of the tubing panels 112. Typically, the tubing T is laid out in a serpentine fashion extending along each longitudinal track and then routing to the next track through the arcuate tracks 115. Typically the outer diameter of the tubing is 5/16 to 7/16 inches. In any event, it is sized to the tracks so that it forms an interference fit within the tracks T.

During construction of the wall 100, typically after the tubing T has been press fit into the tracks 114, 115, a filling material 118 is spread over the tubing panels 112 and the tubing T that is installed within those tubing panels 112. The filling material 118 functions to create a high thermal conductive path between the tubing T and a subsequent drywall panel 110.

Typically, the filling material 118 is spread in the manner of plaster using a trowel to form a smooth skim coat of the filling material 118. Care is especially taken to spread the filling material 118 around the tubing T while also forming a relatively thin layer of the filling material on top of the tubing panels 112. Preferably, the smooth side of the trowel is used to achieve better contact with subsequent layers such as aluminum foil. Further troweling should be performed perpendicular to the tubing T. The filling material also adds to the thermal mass of the system and should even be filled into vacant tracks to further increase the mass.

In the current embodiment, the filling material 118 is a mastic material or an acrylic polymer including limestone and zinc oxide.

In other embodiments, other types of filling materials are used such as plasters and plastic-based filling materials. A common characteristic of the filling materials in the preferred embodiment is that the filling material initially has a putty or wet plaster consistency. It then quickly hardens to form a high thermal conductive relationship with the tubing T. In a particularly preferred embodiment, the filling material is a mastic that is fortified with a high thermal conductive material such as aluminum oxide powder. Other options include material with silicon oxide or graphite. Metal shavings or powder including iron and/or aluminum are mixed with the mastic or filling material in other embodiments. In any event, the metals, non-metals, or oxides are added to improve the thermal transfer properties of the filling material 118.

In one embodiment, a high thermally conductive material layer 119 is applied over the filling material 118. Preferably the high thermally conductive material layer is flexible and thin. Currently aluminum foil is used with a thickness less than 0.2 millimeters (0.0079 in), although thinner gauges down to 0.006 mm can also be used. The foil is extremely pliable, and can be bent or wrapped and laminated to the filling material 118. A spray adhesive is also used in some instances to retain the material layer until subsequent layers are applied or installed.

In alternative embodiment, the high thermally conductive aluminum foil layer 119 is applied to tubing panels 112 and the filling material 118 is applied over both the tubing panels 112 and the high thermally conductive material layer 119. In one implementation, the tubing panels are fabricated with the aluminum foil layer and then the tracks 114, 115 are routed into the tubing panels 112 and through the foil layer 119. In still another embodiment, the filling material is not used and the foil layer 119 is applied directly to the tubing panels and held there with a spray adhesive or using a foil layer with integral adhesive such as adhesive tape.

Next, wall panels 110 are secured to the tubing panels 112. In the preferred embodiment, common drywall panels 110 are used; drywall panels constructed from gypsum plaster that is pressed between two thick sheets of paper. In one embodiment, the drywall panels 110 are secured to the tubing panels 112 while the filling material 118 is still hardening. This ensures a good thermal conductive arrangement between the drywall panels 110 and the tubing T, with the filling material filling in around the tubing T and adhering to the face of the drywall panels. If further ensures good thermal contact with the high thermally conductive aluminum foil layer 119.

In other embodiments, concrete board is used in place of the gypsum drywall as the wall panels. Preferably high-density concrete board is used because of its better thermal conductivity. In one example, HardieBacker 500® brand cement board is used, which is manufactured by James Hardie Building Products.

The tubing panels 112 also include a moisture barrier backing layer 150, in the preferred embodiment. The addition of this layer 150 provides a number of advantages.

The backing layer 150 feature improves tubing panel rigidity. The tracks 114 are currently cut into the panels 112 using CNC routers. This reduces the strength and rigidity of the tubing panels, which is counteracted to some degree by the presence of the backing layer.

The layer 150 also helps to ensure that the panel 112 is held firmly to the vacuum table of the CNC router during fabrication of the tracks 114.

The layer 150 also eliminates internal wall condensation if used in a chilled water cooling system. In one example, the moisture barrier 150 backing is made from a sheet material that is positioned along the inner surface of the wall panel 112. The backing layer 150 prevents moisture from permeating through the wall. A moisture barrier backing 150 is typically made from plastic sheets, treated papers, or metallic foils. Commercially available OSD plywood includes layers or sheets of polyethylene or vinyl paper.

A plaster skim coat 130 or joint compound is applied to the drywall panels to form a smooth wall surface.

Figure 2:
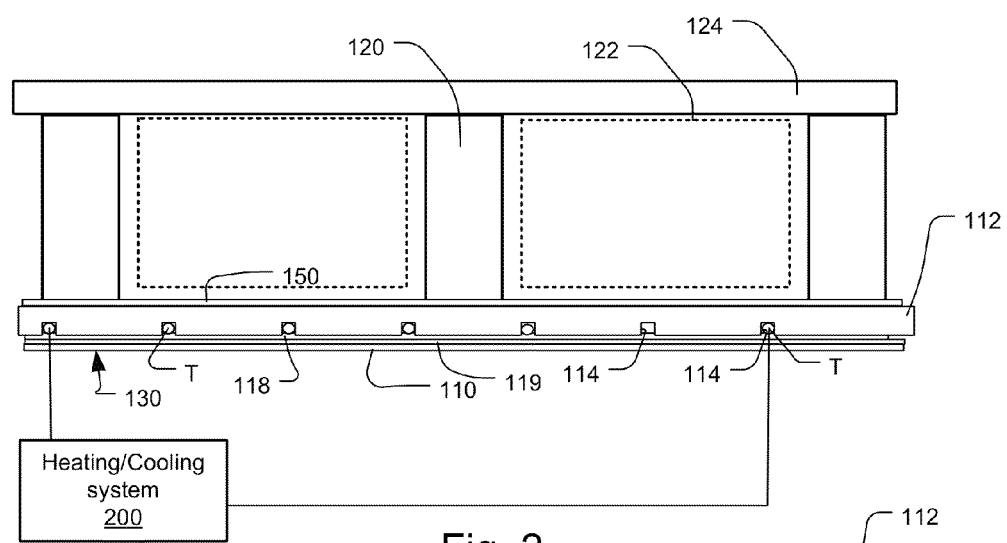
FIGS. 2 and 2A are schematic cross sections of the wall including a hydronic thermal management system.

FIG. 2 shows the wall 100 in cross-section. In particular, it shows the vertically-extending wall support structure that provides the mechanical support to the tubing panels 112. In the illustrated example, the wall support structure includes vertically extending studs 120. Commonly, these studs are 2×4, or 2×6 solid wood studs. On the external side, plywood and siding 124 are typically secured to the studs 120. On the interior side, the tubing panels 112 are secured to the studs 120 by nails, glue and/or screws.

According to a typical construction technique, insulation, such as foam or fiberglass insulation 122 is located between the studs 120.

The filling material 118 is shown as a skim coat over the tubing panels 112 and tubing T, filling in around the tubing. The wallboard panels 110 are nailed or screwed to the tubing panels 112, preferably over the high thermally conductive aluminum foil layer 119. The plaster or joint compound 130 is applied to the drywall panels 110.

Figure 2A:
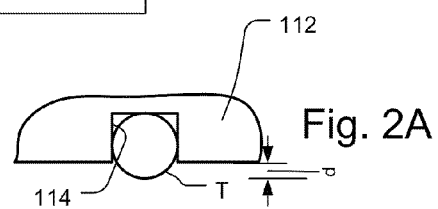

In one implementation detail shown in FIG. 2A, the tracks 114 are sized relative to the diameter of the tubing T such that the tubing projects outward from the surface of the panel 112 by a distance d. Preferably d=1-3 millimeters. This configuration ensures good thermal contact with the aluminum foil layer 119, if present, and the subsequent wall panel 110.

Also shown is the heating/cooling system in the typical implementation, the heating/cooling system 200 includes pumps for flowing a fluid, such as water, through the tubing T. Preferably, the heating/cooling system 200 further includes a boiler for heating the fluid and possibly also a chiller for cooling the fluid during the summer months.

One further advantage of the system is that relatively high temperature water can be used in the tubing T, since direct human contact with walls is far less common than contact with floors, i.e., barefeet. Further, whereas floor covering, i.e., carpeting, usually impedes the heat transfer in floor systems, wall coverings are less common, with insulating wall coverings being far less common.

While this invention has been particularly shown and described with references to preferred embodiments thereof, it will be understood by those skilled in the art that various changes in form and details may be made therein without departing from the scope of the invention encompassed by the appended claims.

What is claimed is:

1. A wall including a hydronic thermal management system, comprising:
   a vertically-extending wall support structure;
   tubing panels secured to the wall support structure, the panels being constructed from wood material and comprising tracks;
   tubing press-fit into the tracks of the tubing panels for carrying a heat transfer fluid, wherein the tubing projects outward relative to the surface of the tubing panels;

wall panels secured over the tubing panels; and an aluminum foil layer extending across the tracks, covering the tubing in the tubing panels and located between the tubing panels and the wall panels.

2. A wall as claimed in claim 1, wherein the aluminum foil has a thickness of less than 0.2 millimeters.

3. A wall as claimed in claim 1, further comprising a filling material between the tubing and the wall panels.

4. A wall as claimed in claim 1, wherein the wall support structure comprises vertically extending studs.

5. A wall as claimed in claim 1, further comprising a thermal control system for flowing the fluid through the tubing.

6. A wall as claimed in claim 5, wherein the thermal control system heats the fluid.

7. A wall as claimed in claim 5, wherein the thermal control system cools the fluid.

8. A wall as claimed in claim 1, further comprising a filling material between the tubing and the wall panels, wherein the filling material is fortified with a high thermal conductivity material.

9. A wall as claimed in claim 1, further comprising a filling material between the tubing and the wall panels, wherein the filling material is fortified with an oxide powder or metal.

10. A wall as claimed in claim 1, further comprising a spray adhesive for attaching the aluminum foil layer to the tubing panels.

11. A wall as claimed in claim 1, further comprising a backing layer on the tubing panels.

12. A method for fabricating a wall including a hydronic thermal management system, the method comprising:

providing a vertically-extending wall support structure;

securing tubing panels to the wall support structure, the panels being constructed from wood material and comprising tracks;

press-fitting tubing into the tracks of the tubing panels for carrying a heat transfer fluid, wherein the tubing projects outward relative to the surface of the tubing panels;

securing wall panels over the tubing panels; and applying an aluminum foil layer extending across the tracks, covering the tubing in the tubing panels and located between the tubing panels and the wall panels.

13. A method as claimed in claim 12, further comprising applying a filling material between the tubing panels and the wall panels.

14. A method as claimed in claim 12, wherein the wall support structure comprises vertically extending studs.

15. A method as claimed in claim 12, further comprising installing insulation between the studs.

16. A method as claimed in claim 12, further comprising flowing the fluid through the tubing.

17. A method as claimed in claim 16, further comprising heating the fluid.

18. A method as claimed in claim 12, further comprising applying filling material between the tubing panels and the wall panels, wherein the filling material is fortified with a high thermal conductivity material.

19. A method as claimed in claim 12, further comprising applying filling material between the tubing panels and the wall panels, wherein the filling material is fortified with metallic oxide powder.

20. A method as claimed in claim 12, further comprising applying a spray adhesive for attaching the aluminum foil layer between the tubing panels and the wall panels.

21. A method as claimed in claim 13, further comprising applying the aluminum foil layer to the filling material that is applied to the tubing panels.

22. A method as claimed in claim 12, further comprising applying a backing layer to the tubing panels.

23. A method as claimed in claim 12, wherein the aluminum foil has a thickness of less than 0.2 millimeters.

* * * * *